(12) United States Patent
Horne (10) Patent No.: US 7,012,884 B2
(45) Date of Patent: *Mar. 14, 2006

(54) ZERO-OVERHEAD METHOD FOR SEQUENCE REVERSIBLE AND PATTERN INDEPENDENT ORTHOGONAL MULTIPLEXING

(75) Inventor: David M. Horne, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 848 days.

This patent is subject to a terminal disclaimer.

(21) Appl. No.: 10/000,895

(22) Filed: Nov. 2, 2001

(65) Prior Publication Data

US 2003/0086365 A1    May 8, 2003

(51) Int. Cl.
*H04J 11/00* (2006.01)
*H04B 7/216* (2006.01)

(52) U.S. Cl. .................. 370/208; 370/335; 370/342; 370/535

(58) Field of Classification Search ........ 370/206–210, 370/335, 342; 375/130, 140, 146, 147, 141
See application file for complete search history.

(56) References Cited

U.S. PATENT DOCUMENTS

| | | | |
|---|---|---|---|
| 5,204,874 A * | 4/1993 | Falconer et al. ............ 375/130 |
| 6,026,118 A | 2/2000 | Horne | |
| 6,134,263 A | 10/2000 | Horne | |
| 6,243,397 B1 * | 6/2001 | Yun ............................ 370/480 |
| 6,396,826 B1 * | 5/2002 | Ohlson et al. .............. 370/342 |
| 6,628,667 B1 * | 9/2003 | Murai et al. ................ 370/468 |
| 2003/0086364 A1 * | 5/2003 | Horne ......................... 370/208 |
| 2004/0085892 A1 * | 5/2004 | Walton et al. .............. 370/208 |

* cited by examiner

*Primary Examiner*—Steven Nguyen
(74) *Attorney, Agent, or Firm*—Blakely, Sokoloff, Taylor & Zafman LLP (57) ABSTRACT

The invention relates to zero-overhead, sequence reversible, and pattern independent orthogonal multiplexing to achieve high bit densities in direct sequence spread spectrum communication systems. A set of orthogonal spreading codes is selected. The orthogonal spreading codes are partitioned into partitioned sets. The partitioned sets are further expanded to include complement codes of the orthogonal spreading codes. The orthogonal spreading codes and the complement codes are mapped into a code index to create a spreading code set. A window of contiguous input data is partitioned into equal-size subsets, which are then mapped to a data index, to create a data set. The data set is mapped to the spreading code set to create a multiplex of spreading codes, and the multiplex of spreading codes are then summed to form a code multiplex. The code multiplex can then be sent in one transmit opportunity.

23 Claims, 5 Drawing Sheets

EXAMPLE N=16; G=2; NON-KEYED (LINEAR) MAPPING

ZERO-OVERHEAD METHOD FOR SEQUENCE REVERSIBLE AND PATTERN INDEPENDENT ORTHOGONAL MULTIPLEXING

BACKGROUND

1. Field of the Invention

The present invention relates to the field of data communications. More particularly the invention describes using a zero-overhead method for sequence reversible and pattern independent orthogonal multiplexing to achieve high bit densities in direct sequence spread spectrum communication systems.

2. Description of Related Art

Direct Sequence Spread Spectrum (DSSS) techniques rely on the use of pseudo-noise carriers, also called spreading codes, spreading sequences, code sequences and chip sequences, and a transmission bandwidth, which is much wider than the minimum required to transmit the information. The transmitter spreads the information by modulating the information with a pseudo-noise spreading sequence. At the receiver, the information is despread to recover the base information. This despreading is accomplished by correlating the received, spread-modulated, signal with the spreading sequence used for the transmission. DSSS is sometimes referred to by the shorthand name "direct spread."

The modulating signal, such as a pseudo-random spreading code signal, possesses a chip rate (analogous to carrier frequency), which is much larger than the data rate of the information signal. This characteristic is required for efficient spreading. Each state of the pseudo-random spreading sequence is referred to as a chip. The spreading sequence (chip sequence) directly modulates each bit of the information signal, hence the name direct spread. Pseudo-randomness of the spreading signal is required in order to recover the original information signal. Since the spreading sequence is deterministic, it can be exactly duplicated at the receiver in order to extract the information signal. If it were truly random, extraction of the information signal via correlation receiver would not be possible.

The spreading operation causes the signal power to be depleted uniformly across the spread bandwidth. Thus, the spread spectrum signal will appear buried in noise to any receiver without the despreading signal. Consequently, it is not only difficult to jam, but it is also difficult to detect its presence in any bandwidth. Any undesired signal picked up during transmission is spread by the receiver in the same way that the transmitter spread the desired signal originally. In other words, the receiver spreads undesired signals picked up during transmission, while simultaneously despreading, or demodulating, the desired information signal. When viewed as a transmit/receive operation, the desired signal is spread-modulated twice, giving back the original signal, while in-band interference is spread-modulated once, and thereby depleted across the full spread bandwidth.

Similarly, Direct Spread Code Division Multiple Access (DS CDMA) is an adaption of conventional DSSS, which accommodates multiple simultaneous access through the use of mutually orthogonal spreading codes. Mutually orthogonal means that the cross correlation of any spreading code in the set is small (ideally zero). In an ideally orthogonal system, orthogonality not only means that there is no mixing of signals, but it also means that there is no interference between signals. In a conventional DS CDMA system, each station is assigned a single spreading code, which conveys one bit of information. All users assigned to a given channel broadcast either a true or complement version of their assigned spreading code simultaneously. Since the codes are orthogonal, each user's spreading code is uniquely decoded by the receiver. The multiple-access is via the orthogonal properties of the spreading code, hence the name CDMA. Like the previously described DSSS systems, stations only transmit one bit of information at a time.

Thus, in conventional DSSS and DS CDMA systems, an input binary data stream is transmitted one bit at a time, and each bit is modulated with a spreading code, wherein each successive transmission is independent of prior transmissions. Furthermore, the spread modulation can occur in either the frequency domain (i.e. by frequency spreading) or the time domain (i.e. by time spreading). Unfortunately, both methods (frequency and time spreading) incur high penalties for transmission efficiency by trading off efficiency for high redundancy. Typically, conventional DSSS and DS CDMA techniques only provide a bit encoding density of $(1/N)*100\%$, where N is the spreading code length.

BRIEF DESCRIPTION OF THE DRAWINGS

The features and advantages of the present invention will become apparent from the following description of the present invention in which.

DESCRIPTION

Embodiments of the present invention relate to methods, devices, and machine-readable mediums, which allow for zero-overhead, sequence reversible, and pattern independent orthogonal multiplexing to achieve high bit densities in direct sequence spread spectrum (DSSS) systems.

A set of orthogonal spreading codes is selected. The orthogonal spreading codes are partitioned into partitioned sets. The partitioned sets are further expanded to include complement codes of the orthogonal spreading codes. The orthogonal spreading codes and the complement codes are mapped into a code index to create a spreading code set. A window of contiguous input data is partitioned into equal-size subsets, which are then mapped to a data index, to create a data set. Thus, a common abstract representation of the two sets—the spreading code set and the data set—is created regardless of their starting sizes or values. The data set is mapped to the spreading code set to create a multiplex of spreading codes, and the multiplex of spreading codes are then summed to form a code multiplex. The code multiplex can then be sent in one transmit opportunity (e.g. from a transmitter device to a receiver device). The above operations encode the data such that the original input data, and the sequence of that original input data, can be reconstructed at the receiver device—without any channel overhead.

The window of input data can consist of any data pattern (all ones, all zeros, or anything in between) and achieves a constant encoding density of 100%, compared to $(1/N)*100\%$ for conventional DSSS and Direct Spread Code Division Multiple Access (DS CDMA) approaches, where N is the spreading code length. Moreover, the input data to be transmitted is mapped in such a way, as will be described in more detail hereinafter, to convey greater bandwidth per transmission than conventional DSSS and DS CDMA approaches.

In the following description, the various embodiments of the present invention will be described in detail. However, such details are included to facilitate understanding of the invention and to describe exemplary embodiments for employing the invention. Such details should not be used to limit the invention to the particular embodiments described because other variations and embodiments are possible while staying within the scope of the invention. Furthermore, although numerous details are set forth in order to provide a thorough understanding of the present invention, it will be apparent to one skilled in the art that these specific details are not required in order to practice the present invention. In other instances details such as, well-known methods, types of data, protocols, procedures, components, networking equipment, electrical structures and circuits, are not described in detail, or are shown in block diagram form, in order not to obscure the present invention. Furthermore, aspects of the invention will be described in particular embodiments but may be implemented in hardware, software, firmware, middleware, or a combination thereof.

Figure 1:
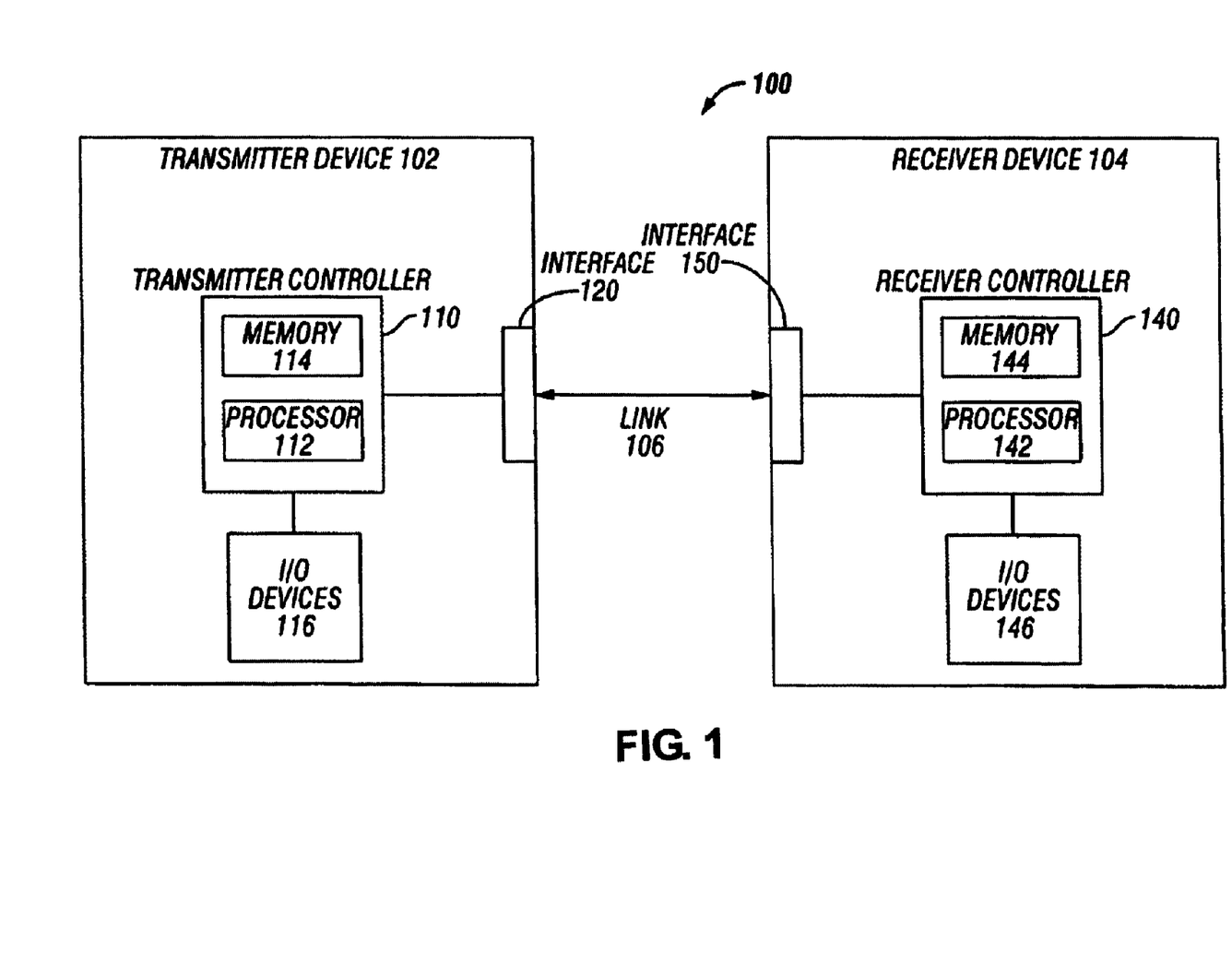
FIG. 1 is a diagram illustrating an exemplary system environment that can employ a zero-overhead method for sequence reversible and pattern independent orthogonal multiplexing according to one embodiment of the invention.

FIG. 1 is a diagram illustrating an exemplary system environment 100 that can employ a zero-overhead method for sequence reversible and pattern independent orthogonal multiplexing according to one embodiment of the invention. As shown in the exemplary environment 100, a transmitter device 102 can be coupled to a receiver device 104 through a link 106. Generally, the environment 100 is a voice and data communications system capable of transmitting voice, audio, data, multimedia (e.g. a combination of audio and video), Web pages, video, or generally any sort of data. It should be appreciated that in the exemplary environment 100, there may be multiple transmitter and receiver devices 102 and 104 coupled together through the link 106. Only one transmitter and one receiver device 102 and 104 are shown in FIG. 1 for brevity.

The transmitter and receiver devices 102 and 104 can include standard telephones, cell-phones, digital phones, mobile computers (e.g. personal digital assistant (PDA), a wearable computer, a wireless handset, a Palm Pilot, etc.), computer systems (e.g. personal computer (laptop/desktop), network computer, server computer, or any other type of computer), or any other sort of computing/telecommunication device capable of processing data.

As is illustrated in FIG. 1, transmitter and receiver devices 102 and 104 are bi-directionally coupled by a link 106. A "link" is broadly defined as a communication network formed by one or more transport mediums. The transmitter and receiver devices 102 and 104 can communicate via the link 106 utilizing one or more of a wireless system, cellular phone system, the plain old telephone system (POTS), cable, Digital Subscriber Line, Integrated Services Digital Network, satellite connection, computer network (e.g. a wide area network (WAN), the Internet, or a local area network (LAN), etc.), or generally any sort of private or public telecommunication system, and combinations thereof.

Examples of a transport medium include, but are not limited or restricted to wireless channels (e.g. radio frequency (RF), terrestrial, satellite, or any other wireless signaling methodology), electrical wire, optical fiber, cable including twisted pair. etc.

The data traffic communicated between the transmitter and receiver device 102 and 104 over link 106 can be of any type analog, digital, etc., and in any type of format or protocol—e.g. wireless protocols, cellular protocols, Internet Protocol (IP), Asynchronous Transfer Mode (ATM), Frame Relay (FR), Point-to-Point Protocol (PPP), Voice over Internet Protocol (VoIP), or any other sort of data protocol. The data traffic between the transmitter and receiver device 102 and 104 over link 106 may be of any type including but not limited to—voice, audio, graphics, video, e-mail, Fax, text, multi-media, documents and other generic forms of data.

It should be appreciated that in the exemplary environment 100, there may be multiple transmitter and receiver devices 102 and 104 coupled together through the link 106 and the link 106 may include multiple connections therebetween (e.g. base stations, satellite connections, POTS connections, cable head-ends, computer systems, servers, personal computers, etc.). Moreover, it should be appreciated that the FIG. 1 environment is only exemplary and that embodiments of the present invention can be used with any type of wireless or wired telecommunication system and/or computer network, protocols, and combinations thereof.

In one embodiment, aspects of the zero-overhead method for sequence reversible and pattern independent orthogonal multiplexing invention can be implemented in both the transmitter and receiver devices 102 and 104. In an exemplary embodiment, the transmitter and receiver devices 102 and 104 generally include, among other things, a processor, data storage devices such as non-volatile and volatile memory, and interfaces (e.g. antennas, modems, or other types of network interfaces etc.). For example, the transmitter device 102 may include a transmitter controller 110 having a processor 112 and a memory 114, Input/Output devices 116, and an interface 120. Similarly, the receiver device 102 may include a receiver controller 140 having a processor 142 and a memory 144, Input/Output devices 146, and an interface 150. The Input/Output devices of the transmitter and receiver devices 102 and 104, respectively, may include among other things: display devices (e.g. a liquid crystal display (LCD)), keypads, screens to receive written information from a pen or another device, a mouse, a trackball, a pointing device, a modem, a printer, media cards (e.g. audio, video, graphics), network cards, peripheral controllers, a hard disk, a floppy drive, an optical digital storage device, a magneto-electrical storage device, Digital Video Disk (DVD), Compact Disk (CD), etc., or any combination thereof.

Moreover, the interfaces 120 and 150 can be any sort of suitable interface for the transmitter and receiver devices 102 and 104 and the type of link 106 therebetween. For example, plain old telephone system (POTS) transmitter/receivers, cellular telephone transmitters/receivers, wireless transmitters/receivers, network interface cards, internal/external modems (standard telephone modem, Digital Subscriber Line (DSL) modem, cable modem, etc.), etc., can be used, or any combination thereof.

Those skilled in the art will recognize any combination of the above components, or any number of different components, peripherals, and other devices, may be used with transmitter and receiver devices 102 and 104, and that this discussion is for explanatory purposes only.

In continuing with the example of the exemplary transmitter and receiver devices 102 and 104, both the transmitter and receiver devices may operate under the control of an operating system that is booted into the non-volatile memory of the device for execution when the device is powered-on or reset. In turn, the operating system controls the execution of one or more computer programs. These computer programs typically include application programs that aid the user in utilizing the device.

In particular, in one embodiment of the invention, aspects of the zero-overhead method for sequence reversible and pattern independent orthogonal multiplexing invention can be implemented in the transmitter and receiver devices 102 and 104 under the control of their respective processor 112 and 142 and in conjunction with their respective memories 114 and 144. The processors process information in order to implement the functions of the zero-overhead method for sequence reversible and pattern independent orthogonal multiplexing invention. As illustrative examples, the "processor" may include a digital signal processor, a microcontroller, a state machine, or even a central processing unit having any type of architecture, such as complex instruction set computers (CISC), reduced instruction set computers (RISC), very long instruction word (VLIW), or hybrid architecture. The memories 114 and 144 can be non-volatile or volatile memory, or any other type of memory, or any combination thereof. Examples of non-volatile memory include a hard disk, flash memory, battery-backed random access memory, Read-only-Memory (ROM) and the like whereas volatile memory includes random access memory (RAM), dynamic random access memory (DRAM) or static random access memory (SRAM), and the like.

The zero-overhead method for sequence reversible and pattern independent orthogonal multiplexing can be implemented as one or more instructions (e.g. code segments), to perform the desired functions of the invention. When implemented in software, the elements of the present invention are the instructions/code segments to perform the necessary tasks. The instructions which when read and executed by a machine or processor (e.g. processor 112 and 142), cause the machine or processor to perform the operations necessary to implement and/or use embodiments of the invention. The program or code segments can be stored in a machine readable medium (e.g. a processor readable medium or a computer program product), or transmitted by a computer data signal embodied in a carrier wave, or a signal modulated by a carrier, over a transmission medium or communication link. The machine-readable medium may include any medium that can store or transfer information in a form readable and executable by a machine (e.g. a processor, a computer, etc.). Examples of the machine readable medium include an electronic circuit, a semiconductor memory device, a ROM, a flash memory, an erasable programmable ROM (EPROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via networks such as the Internet, Intranet, etc.

Those skilled in the art will recognize that the exemplary environments illustrated in FIG. 1 are not intended to limit the present invention. Indeed, those skilled in the art will recognize that other alternative system environments, transmitter devices, and receiver devices may be used without departing from the scope of the present invention. Furthermore, while aspects of the invention and various functional components have been described in particular embodiments, it should be appreciated these aspects and functionalities can be implemented in hardware, software, firmware, middleware or a combination thereof.

Figure 2:
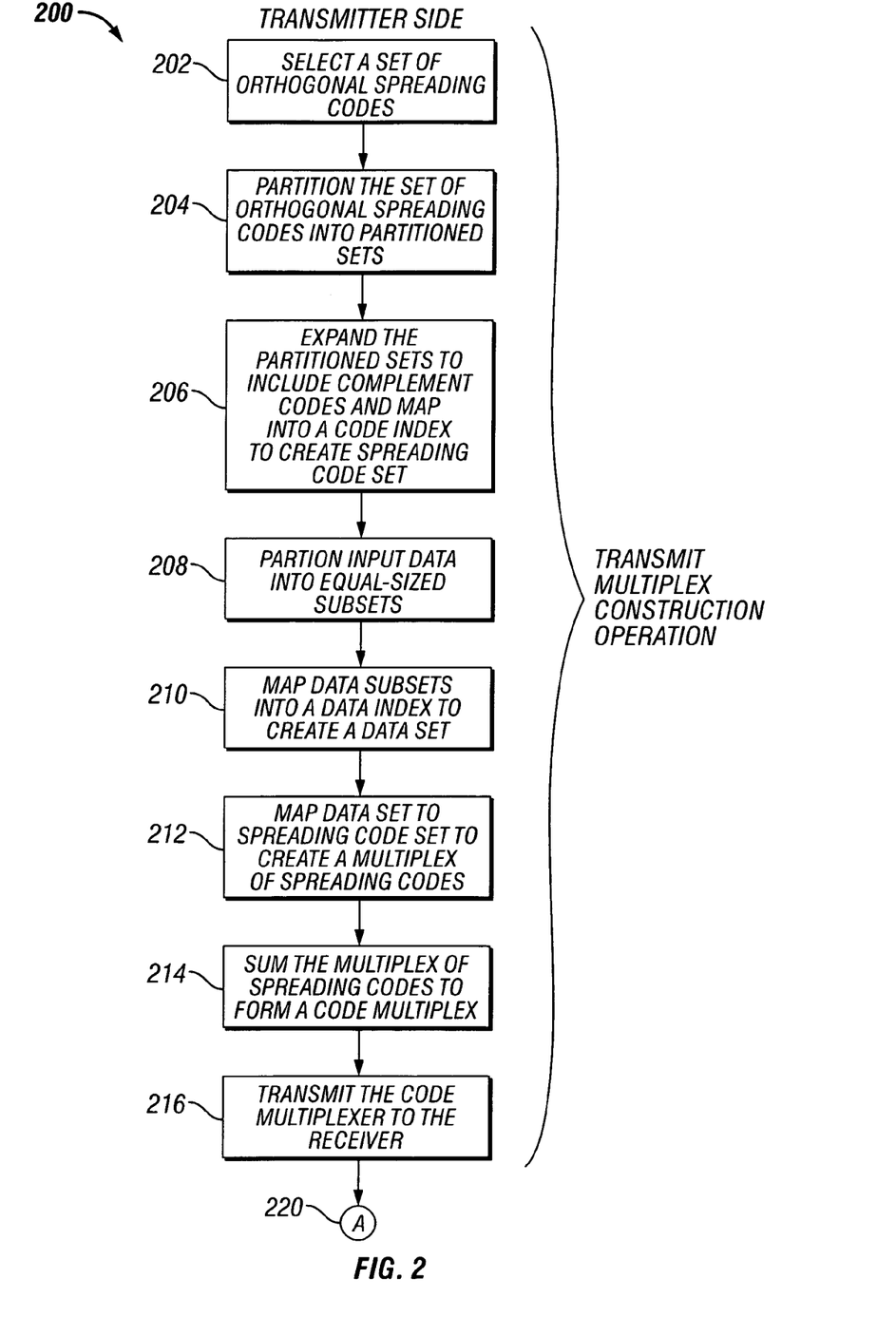
FIG. 2 is a flow diagram illustrating a zero-overhead method for sequence reversible and pattern independent orthogonal multiplexing, at the transmit side, according to one embodiment of the invention.

FIG. 2 is a flow diagram illustrating a zero-overhead method 200 for sequence reversible and pattern independent orthogonal multiplexing, at the transmit side, i.e. the transmitter device 102, according to one embodiment of the invention. At block 202, a set of orthogonal spreading codes is selected. Next, at block 204, a set of orthogonal spreading codes are partitioned into partitioned sets. The partitioned sets are expanded to include the complement codes of the orthogonal spreading codes and the orthogonal spreading codes and the complement codes of the orthogonal spreading codes are mapped into a code index to create a spreading code set (block 206). It should be appreciated that the results of the partitioning, mapping, and sequence method blocks and definitions (blocks 202, 204, and 206), i.e., the orthogonal spreading codes, the partitioned orthogonal spreading codes, the expanded partitioned sets including complements, the code index, the spreading code set, etc., as previously discussed, are usually required to be known at the receiver device 104, a priori, for the method to work properly.

Looking at the input data, the input data is partitioned into equal-sized data subsets (block 208). These data subsets have a minimum size of 2 bits, and the input data usually takes the form of a window of data that can be broken up into equally-sized data subsets. Next, the equal-sized data subsets are mapped into a data index to create a data set (block 210). At block 212, a data set is mapped to the spreading code set to create a multiplex of spreading codes. Then, at block 214, the multiplex of spreading codes are summed to create a code multiplex. Blocks 204 through 214 represent what could be termed the transmit multiplex construction of operation, in that, these operations create a code multiplex at the transmitter device 102, which is ultimately transmitted via link 106, to the receiver device 104. The transmitter device may also include other operations, such as modulation and/or coding, that may be appropriate for the link 106. Accordingly, at block 216 the code multiplex is transmitted to the receiver device 104. At block 220, the process continues on to the receiver side, i.e. the receiver device 104, as will be discussed with reference to FIG. 3.

Figure 3:
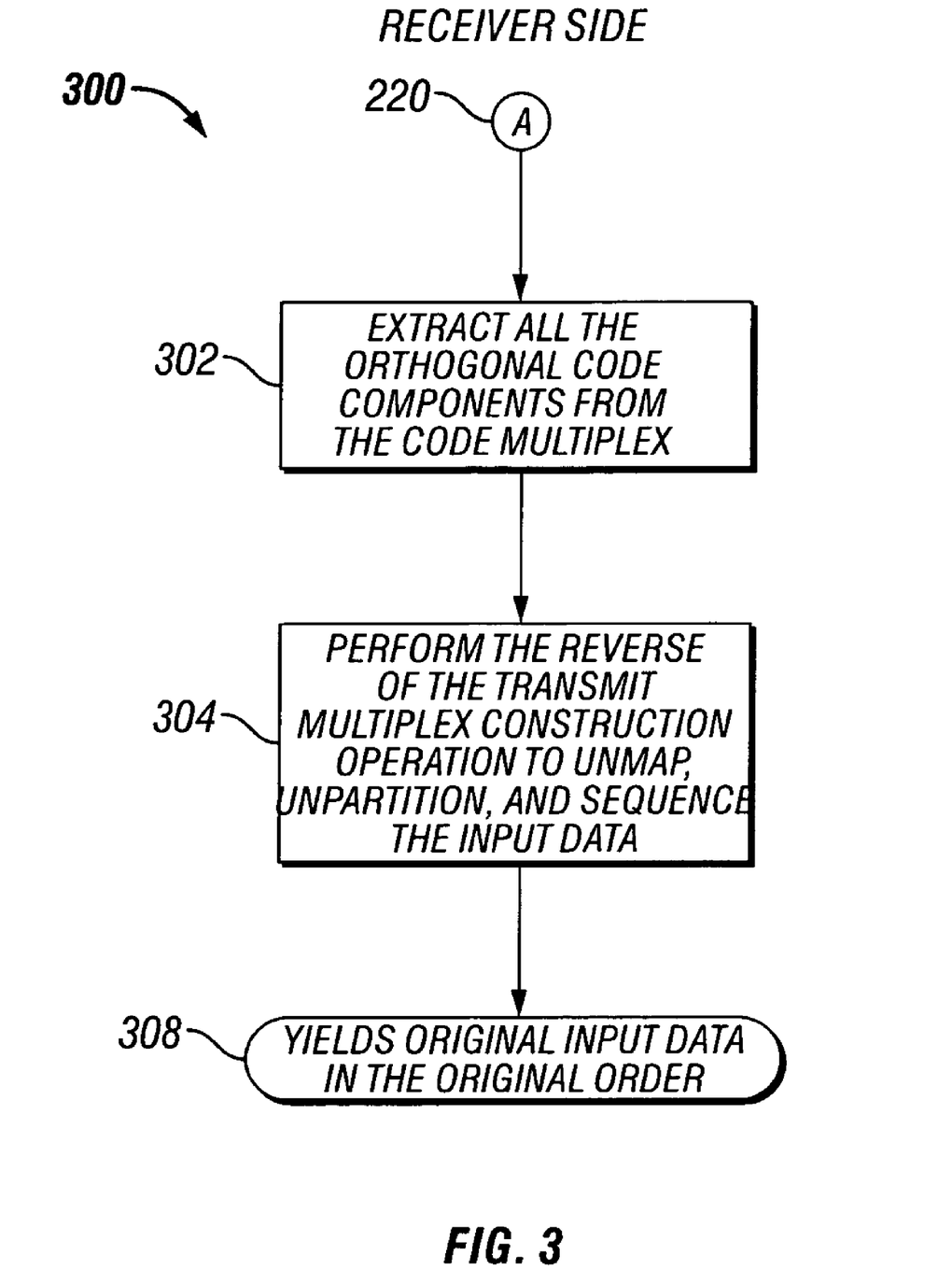
FIG. 3 is a flow diagram illustrating a zero-overhead method for sequence reversible and pattern independent orthogonal multiplexing, at the receive side, according to one embodiment of the invention.

FIG. 3 is a flow diagram 300 illustrating a zero-overhead method for sequence reversible and pattern independent orthogonal multiplexing, at the receive side, i.e. at the receiver device 104, according to one embodiment of the invention. At block 302, the code multiplex is received at the receiver device 104 and all the orthogonal code components are extracted from the code multiplex. Next, at block 304, the reverse of the transmit multiplex construction operation is performed to unmap, unpartition, and sequence the input data. Thus, at block 308, the original input data is yielded in the original order at the receiver device 104.

Thus, by transmitting a multiplex of distinct orthogonal spreading codes per transmit opportunity—rather than a single code—multiple bits of data can be conveyed. Advantageously, by using two sets of multiple partitioning and mapping operations to reduce the data and the spreading code sets to a common abstract representation, respectively, this permits a modified representation of the data set to be mapped onto a modified representation of the spreading code set via a normalized parameter interface. The normalized interface in turn allows the method to scale to arbitrary sizes proportional to $2^N$. Thus, the disclosed method can use the multiplexed orthogonal spreading codes and the multiple operations on the data and spreading code sets to greatly improve bit density per transmit opportunity, while maintaining the inherent desirable properties of direct sequence spread spectrum modulation (DSSS). Since fewer spreading codes are required to be transmitted to achieve a given bandwidth, there is also a reduction in the transmitted peak-to-average ratio. As discussed previously, the window of input data can consist of any data pattern (all ones, all zeros, or anything in between) and achieves a constant encoding density of 100%, compared to $(1/N)*100\%$ for conventional DSSS and DS CDMA approaches, where N is the spreading code length. Moreover, the disclosed method achieves these bit density gains without dependence on the actual data values being transmitted over time (i.e. without regards to run-length, 0/1 balance, and patterns), restores the natural sequence of the input data values from the original input data upon recovery at the receiver device, and further achieves all of these benefits without any channel overhead.

Figure 4A:
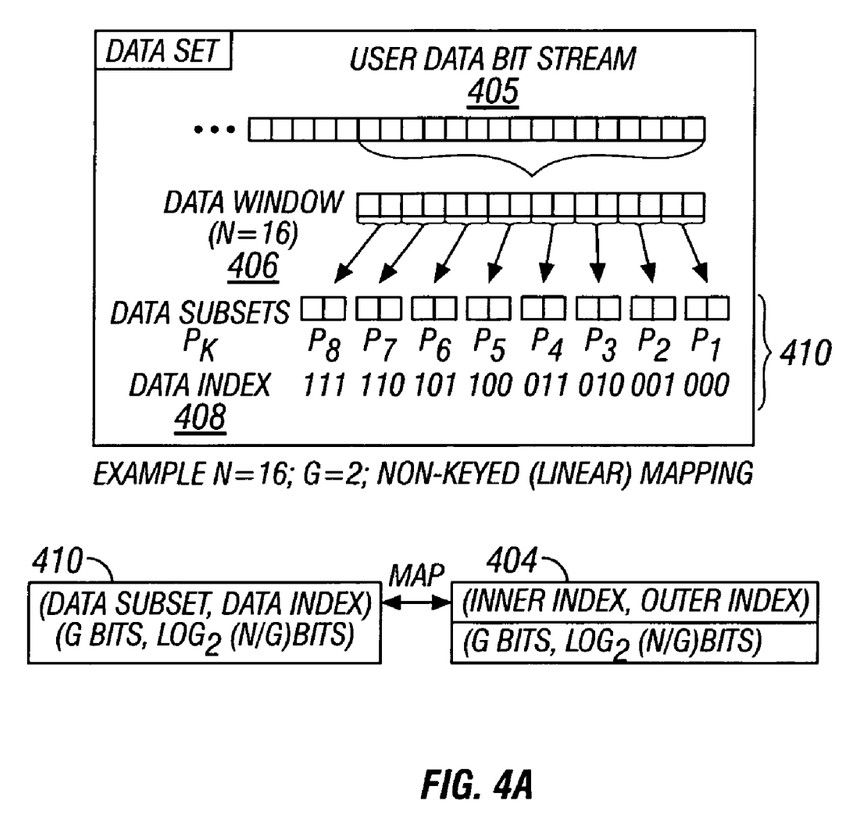
FIG. 4 provides an example of data sets and orthogonal code sets used in a zero-overhead method for sequence reversible and pattern independent orthogonal multiplexing according to one embodiment of the invention.
Figure 4B:
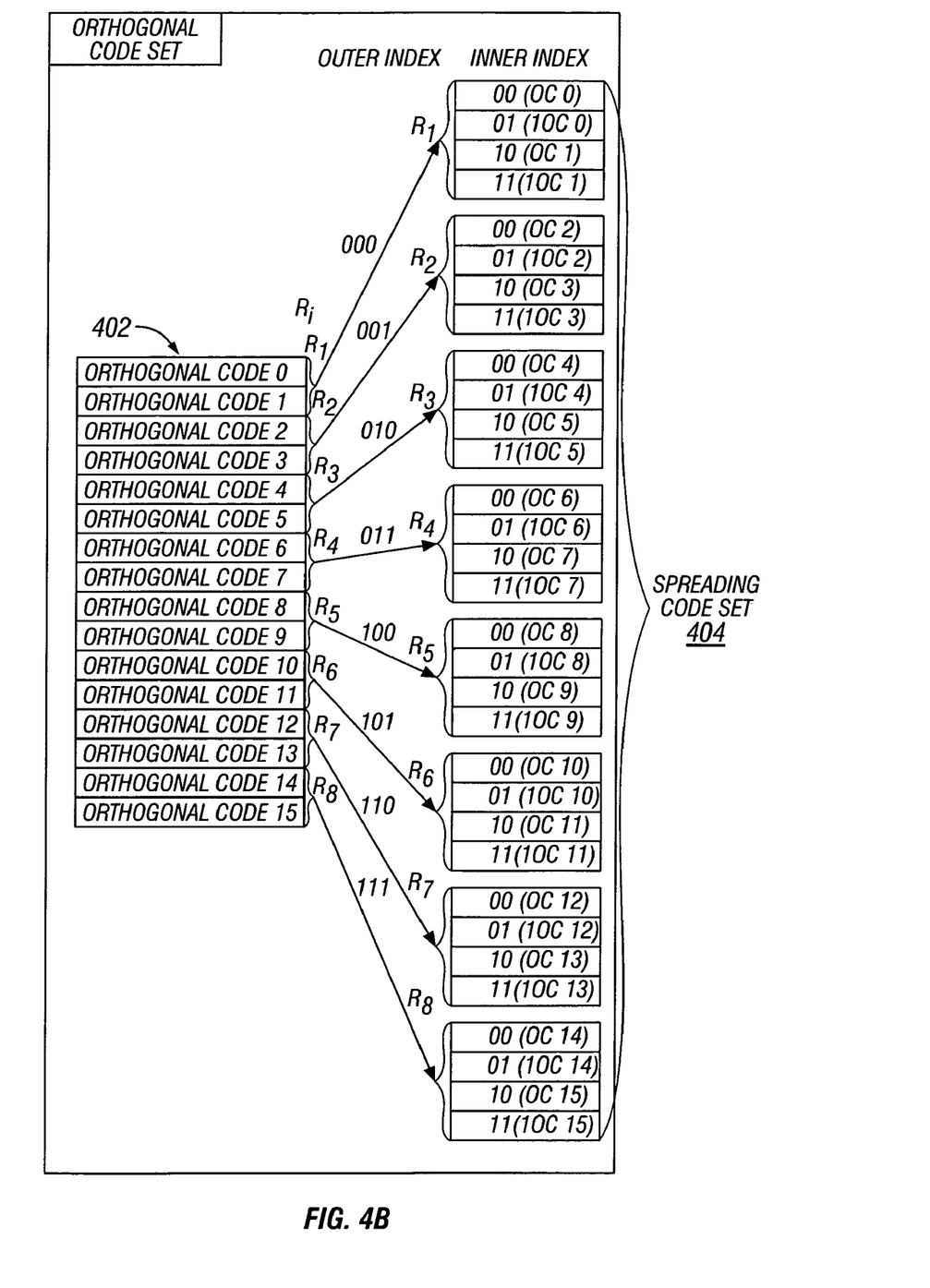

The method of FIGS. 2 and 3 will now be discussed and illustrated with particular reference to FIG. 4, which provides examples of data sets and orthogonal code sets used in the zero-overhead method for sequence reversible and pattern independent orthogonal multiplexing according to one embodiment of the invention. Thus, a generalized procedure for creating the orthogonal code multiplex and recovering the original data from the code multiplex in its proper sequence will be described with this particular example.

As previously discussed, at block 202 of method 200, a set of orthogonal spreading codes is selected. Particularly, as shown in FIG. 4, a set of orthogonal codes 402 is selected from the universe of orthogonal code sets that are square (e.g. N×N), where N is a power of 2. In the present example of FIG. 4, N=16, and thus the orthogonal codes 0–15 are shown. Next, the set of orthogonal spreading codes is partitioned into partitioned sets (block 204). Particularly, in the example of FIG. 4, the orthogonal codes are partitioned into groups of size G (e.g. G=2). Thus, there are N/G (e.g. 8) partitioned groups of size G (e.g. 2). As shown in FIG. 4, these groups are denoted as $R_i$, i=1 to N/G (e.g. 8), such that they are shown as $R_1$, $R_2$, $R_3$, $R_4$, $R_5$, $R_6$, $R_7$, and $R_8$. The subscript i corresponds to the outer index in FIG. 4.

The partitioned sets are then expanded to include the complement codes of the orthogonal spreading codes and the orthogonal spreading codes and the complement codes of the orthogonal spreading codes are mapped into a code index to create a spreading code set 404 (block 206). Particularly, the G codes (e.g. G=2) in each group $R_i$ are expanded to include the complement codes such that a total of 2*G (e.g. 4) codes are present per $R_i$. These 2*G (e.g. 4) codes per $R_i$ are mapped in a 1:1 mapping (i.e. the ($\log_2(2*G)$)-bit codes that represent $2^G$ objects). This is repeated for each of the N/G (e.g. 8) groups designated by $R_i$ (e.g. $R_1$, $R_2$, $R_3$, $R_4$, $R_5$, $R_6$, $R_7$, and $R_8$) to complete the inner mapping of the partitioned orthogonal spreading codes and the complement codes of the orthogonal spreading codes into the inner code index to create the spreading code set 404. The outer mapping to assign the outer index is via the i subscript from the sequence of the $R_i$ (as shown in FIG. 4: $R_1$, $R_2$, $R_3$, $R_4$, $R_5$, $R_6$, $R_7$, and $R_8$). In the example of FIG. 4, this is shown as a direct linear mapping, for clarity. However, the mappings may also be scrambled via an encryption key for enhanced security.

It should be appreciated that the results of the partitioning, mapping, and sequence method blocks and definitions (blocks 202, 204, and 206), i.e., the orthogonal spreading codes, the partitioned orthogonal spreading codes, the expanded partitioned sets including complements, the code index, the spreading code set, etc., as previously discussed, are usually required to be known at the receiver device 104, a priori, for the method to work properly.

Looking at the input data, the contiguous user input data 405 is partitioned into a data window of size N (e.g. N=16) 406, which is equal to the size of the orthogonal spreading code (or the length of an individual spreading code, which is the same size (i.e. the orthogonal code set is (N×N)). The input data of the data window 406 is then partitioned into equal-sized subsets of G (e.g. G=2) to preserve the natural order (block 208). It should be noted that the data subsets have a minimum size of 2 bits, and the data window 406 is formed such that it can be broken up into equally sized data subsets. These equal-sized data subsets can be termed $P_k$, k=1 to N/G (e.g. 8), for easy reference, such that, as shown in FIG. 4, the equal sized data subsets $P_k$ are shown as $P_1$, $P_2$, $P_3$, $P_4$, $P_5$, $P_6$, $P_7$, and $P_8$. Next, the ordered equal-sized data subsets are mapped into a data index 408 to create a data set 410 (block 210).

The data set 410 is then mapped to the spreading code set 404 to create a multiplex of spreading codes (block 212). Particularly, the ordered $P_k$'s are mapped to the ordered $R_i$'s to create a set of N/G (e.g. 8) orthogonal codes (i.e. to create the multiplex of spreading codes). Next, the multiplex of spreading codes are summed to create a code multiplex (block 214). These previously described operations (e.g. blocks 204 through 214) represent what could be termed the transmit multiplex construction operation, in that, these operations create a code multiplex at the transmitter device 102, which is ultimately transmitted via link 106, to the receiver device 104. Accordingly, the code multiplex is transmitted to the receiver device 104 (block 268).

As previously described with reference to FIG. 3, at the receiver side (e.g. at the receiver device 102), the code multiplex is passed through a correlator to extract all of the orthogonal code components from the code multiplex (block 302). Moreover, as previously discussed, the reverse of the transmit multiplex construction operation is performed to unmap, unpartition, and sequence the input data (block 304), such that the original N-bit input data (e.g. data window 406) is yielded in the original order.

It should be noted that there are an infinite number of partitioning schemes and sizes, as well as, subsequent mapping methods that can be used. The disclosed method advantageously produces 100 percent efficiency for all power-of-2, N by N (N×N square matrix), orthogonal spreading code sets. This is in comparison to the efficiency of $(1/N)*100\%$ for conventional DSSS and DS CDMA systems (where N is the spreading code length). In addition, the peak-to-average ratio (PAR) is reduced for the disclosed method since N user bits are conveyed via N/2 spreading codes in the multiplex.

As previously discussed, in the prior art DSSS and DS CDMA systems, multiple stations simultaneously convey one bit of information. However, in the embodiments of the present invention, each station (e.g. transmitter devices 102 and receiver devices 104) of an overall system 100 share a common set of spreading code sets 404 (e.g. N=16 spreading codes), and use data-dependent encoding of user-data-to-spreading-codes for the purpose of increasing the transmit capacity (e.g. by a factor of 16 in the example embodiment). Accordingly, point-to-point increased bandwidth is provided between a transmitter device 102 and a receiver device 104.

The stations (e.g. transmitter devices 102 and receiver devices 104) may be a part of a multi-diversity multiple access network, where multiple frequencies and multiple timeslots are available to all individual users. It should be noted that the embodiments of the present invention do not use orthogonal codes to achieve multiple access by individual users, but instead use orthogonal codes to give an individual station greater bandwidth, rather than acting to achieve multiple user access to a shared medium. In embodiments of the present invention, multiple access can be achieved by using, for example, either the time domain (TDMA) or the frequency domain (FDM or OFDM).

Moreover, in embodiments of the present invention, the spreading code set 404 (which is common to the end stations—i.e. the transmitter devices 102 and the receiver devices 104) is used to allow the reconstruction of the sequence of input data, which is implicitly conveyed without any overhead. Furthermore, due to the time, frequency, and code-space orthogonality, each station in the system can utilize the same partitioned set of spreading codes and transmit multiple spreading codes per time/frequency slot without interference. This allows each station to convey multiple bits of information per time/frequency slot. In a general DSSS or DS CDMA system, this would not be possible.

Also, it should be noted, that as to the previously described method, the most simple and direct mapping assignments were used to simplify the description. In mapping the orthogonal spreading codes after they have been partitioned, there are actually a large number of possible ways to perform the mapping to indexes (e.g. the outer and inner indexes of FIG. 4). Thus, by using this mapping flexibility, a security layer can be added on top of the disclosed method.

In conclusion, embodiments of the present invention for a zero-overhead method for sequence reversible and pattern independent orthogonal multiplexing, involve two independent sets of multiple partitioning and mapping operations to normalize the data set and the spreading codes set. One set of operations is performed on the data set, and the other on the spreading code set. This is followed by a final mapping of one normalized set onto the other. For both initial sets, the partitioning and mapping operations reduce the sets to a common abstract representation. This allows the data set to be mapped to the spreading code set through an abstraction interface. The actual values are hidden behind the abstraction layer that joins the two sets with a common parameter interface. Advantageously, this allows the data set to be mapped to the spreading code set without consideration for repeated values, run-length (consecutive 1's), or 0/1 balance. The partitioning and mapping steps applied to the spreading code set insures that no spreading code will be added to the multiplex more than once, irrespective of repetitive input data. Moreover, a multiplex of distinct orthogonal spreading codes can be transmitted per transmit opportunity—rather than a single code—such that multiple bits of data can be conveyed. Furthermore, the sequence information is recoverable at the receiver device without overhead because the overall partitioning and mapping process—which involves defined sequences of operations— is known to the receiver device.

While the present invention and its various functional components have been described in particular embodiments, it should be appreciated the present invention can be implemented in hardware, software, firmware, middleware or a combination thereof and utilized in systems, subsystems, components, or sub-components thereof. When implemented in software, the elements of the present invention are the instructions/code segments to perform the necessary tasks. The program or code segments can be stored in a machine readable medium (e.g. a processor readable medium or a computer program product), or transmitted by a computer data signal embodied in a carrier wave, or a signal modulated by a carrier, over a transmission medium or communication link. The machine-readable medium may include any medium that can store or transfer information in a form readable and executable by a machine (e.g. a processor, a computer, etc.). Examples of the machine-readable medium include an electronic circuit, a semiconductor memory device, a ROM, a flash memory, an erasable programmable ROM (EPROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via networks such as the Internet, Intranet, etc.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method comprising:
   selecting a set of orthogonal spreading codes;
   partitioning the set of orthogonal spreading codes into partitioned sets;
   expanding the partitioned sets to include complement codes of the orthogonal spreading codes;
   mapping the orthogonal spreading codes and the complement codes of the orthogonal spreading codes into a code index to create a spreading code set;
   partitioning input data to create a data set;
   mapping the data set to the spreading code set to create a code multiplex; and
   transmitting the code multiplex.

2. The method of claim 1, wherein, partitioning input data to create a data set further includes partitioning the input data into equal-sized subsets of data.

3. The method of claim 2, wherein, creating a data set further includes mapping the equal-sized subsets of data into a data index.

4. The method of claim 1, wherein, creating a code multiplex further includes:
   mapping the data set to the spreading codes to create a multiplex of spreading codes; and
   summing the multiplex of spreading codes to form the code multiplex.

5. The method of claim 1, further comprising receiving the code multiplex.

6. The method of claim 5, further comprising extracting orthogonal code components from the code multiplex.

7. The method of claim 6, further comprising:
   unmapping the code multiplex; and
   unpartitioning the code multiplex.

8. The method of claim 7, further comprising:
   sequencing the unmapped and unpartitioned code multiplex to yield the input data.

9. A system comprising:
   a transmitter device to:
   select a set of orthogonal spreading codes;
   partition the set of orthogonal spreading codes into partitioned sets;
   expand the partitioned sets to include complement codes of the orthogonal spreading codes;

map the orthogonal spreading codes and the complement codes of the orthogonal spreading codes into a code index to create a spreading code set;

partition input data to create a data set;

map the data set to the spreading code set to create a code multiplex; and transmit the code multiplex; and a receiver device to receive the code multiplex.

10. The system of claim 9, wherein, partitioning input data to create a data set further includes partitioning the input data into equal-sized subsets of data.

11. The system of claim 10, wherein, creating a data set further includes mapping the equal-sized subsets of data into a data index.

12. The system of claim 9, wherein, creating a code multiplex further includes:

mapping the data set to the spreading codes to create a multiplex of spreading codes; and summing the multiplex of spreading codes to form the code multiplex.

13. The system of claim 12, wherein the receiver device extracts orthogonal code components from the code multiplex.

14. The system of claim 13, wherein the receiver device further:

unmaps the code multiplex; and unpartitions the code multiplex.

15. The system of claim 14, wherein the receiver device further:

sequences the unmapped and unpartitioned code multiplex to recreate the input data.

16. A transmitting device comprising:

a processor to:

select a set of orthogonal spreading codes;

partition the set of orthogonal spreading codes into partitioned;

expand the partitioned sets to include complement codes of the orthogonal spreading codes;

map the orthogonal spreading codes and the complement codes of the orthogonal spreading codes into a code index to create a spreading code set;

partition input data to create a data set; and map the data set to the spreading code set to create a code multiplex; and a transmitter interface to transmit the code multiplex through a link to a receiver device.

17. The transmitting device of claim 16, wherein, partitioning input data to create a data set further includes partitioning the input data into equal-sized subsets of data.

18. The transmitting device of claim 17, wherein, creating a data set further includes mapping the equal-sized subsets of data into a data index.

19. The transmitting device of claim 16, wherein, creating a code multiplex further includes:

mapping the data set to the spreading codes to create a multiplex of spreading codes; and summing the multiplex of spreading codes to form the code multiplex.

20. A machine-readable medium having stored thereon instructions, which when executed by a transmitting device, cause the transmitting device to perform the following operations:

selecting a set of orthogonal spreading codes;

partitioning the set of orthogonal spreading codes into partitioned sets;

expanding the partitioned sets to include complement codes of the orthogonal spreading codes;

mapping the orthogonal spreading codes and the complement codes of the orthogonal spreading codes into a code index to create a spreading code set;

partitioning input data to create a data set;

mapping the data set to the spreading code set to create a code multiplex; and transmitting the code multiplex.

21. The machine-readable medium of claim 20, wherein, partitioning input data to create a data set further includes instructions for partitioning the input data into equal-sized subsets of data.

22. The machine-readable medium of claim 21, wherein, creating a data set further includes mapping the equal-sized subsets of data into a data index.

23. The machine-readable medium of claim 22, wherein, creating a code multiplex further includes instructions for:

mapping the data set to the spreading codes to create a multiplex of spreading codes; and summing the multiplex of spreading codes to form the code multiplex.

* * * * *